April 27, 1926.

W. LAW

GRINDING MACHINE

Filed Dec. 17, 1923    3 Sheets-Sheet 1

1,582,481

Inventor:
William Law
By Geo. H. Kennedy
Attorney

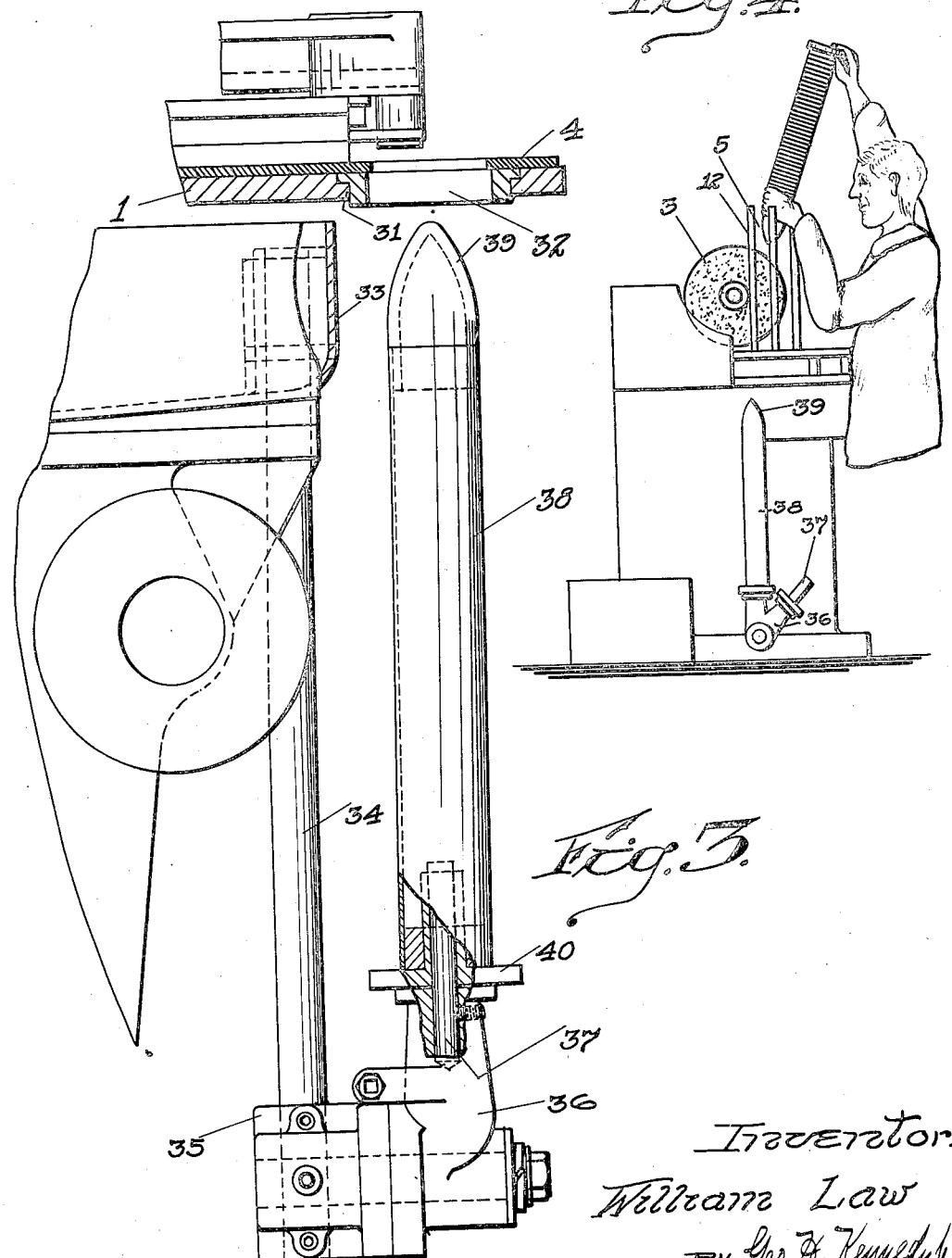

April 27, 1926. 1,582,481
W. LAW
GRINDING MACHINE
Filed Dec. 17, 1923   3 Sheets-Sheet 3

Inventor:
William Law
By Geo. H. Kennedy Jr.
Attorney

Patented Apr. 27, 1926.

1,582,481

UNITED STATES PATENT OFFICE.

WILLIAM LAW, OF WESTBORO, MASSACHUSETTS, ASSIGNOR TO THE HEALD MACHINE COMPANY, OF WORCESTER, MASSACHUSETTS, A CORPORATION OF MASSACHUSETTS.

GRINDING MACHINE.

Application filed December 17, 1923. Serial No. 681,163.

*To all whom it may concern:*

Be it known that I, WILLIAM LAW, a citizen of the United States, residing at Westboro, in the county of Worcester and Commonwealth of Massachusetts, have invented a new and useful Improvement in a Grinding Machine, of which the following, together with the accompanying drawings, is a specification.

The present invention relates to automatic grinding machines, wherein the pieces of work to be operated upon are presented successively by mechanical means, to the grinding wheel. The invention is here shown as a mechanism for the automatic handling of small flat articles, such as piston rings, in the act of presenting them successively to the grinding wheel, where each article or ring is subjected to rotation by a magnetic chuck or other holding means.

The invention contemplates improvements in mechanism of this class, including an improved construction of work magazine and a more accurate and certain driving mechanism for the work carriage,—the latter adapted to convey each piece of work from the magazine to grinding position, and then, after grinding, to move each piece to a suitable delivery mechanism. In connection with the latter, a feature of special significance is the provision made by the invention for collecting the articles or pieces of work successively delivered by the carrier in such a manner as to facilitate their return, in an inverted position, to the magazine, thus to secure the grinding of said pieces on their faces opposite to those first ground. Other and further features and advantages of the invention forming the subject of the present invention will be apparent as the description thereof proceeds, reference being had to the accompanying drawings, in which—

Fig. 3 is a detail view showing the collecting device for the pieces of work in position on the machine.

Fig. 4 is a view showing the manner of using said collecting device.

Like reference characters refer to like parts in the different figures.

Figure 1:
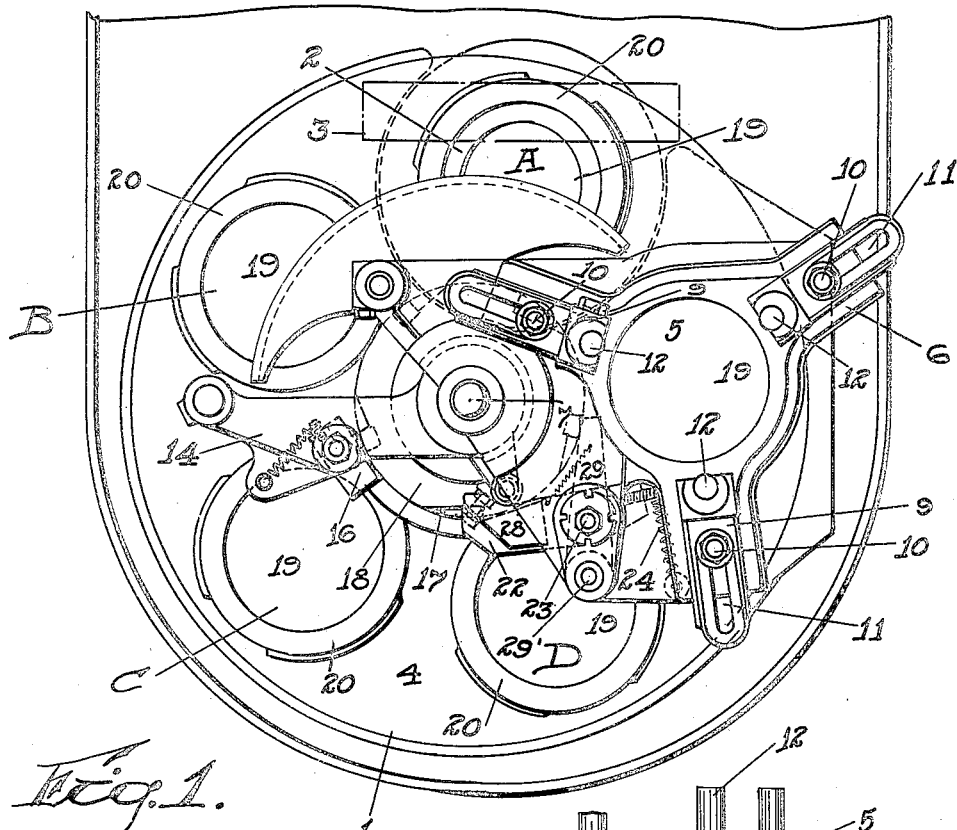
Fig. 1 is a top plan view of the mechanism, shown in operative relation to the grinding wheel and rotating magnetic chuck of an automatic grinding machine.
Figure 2:
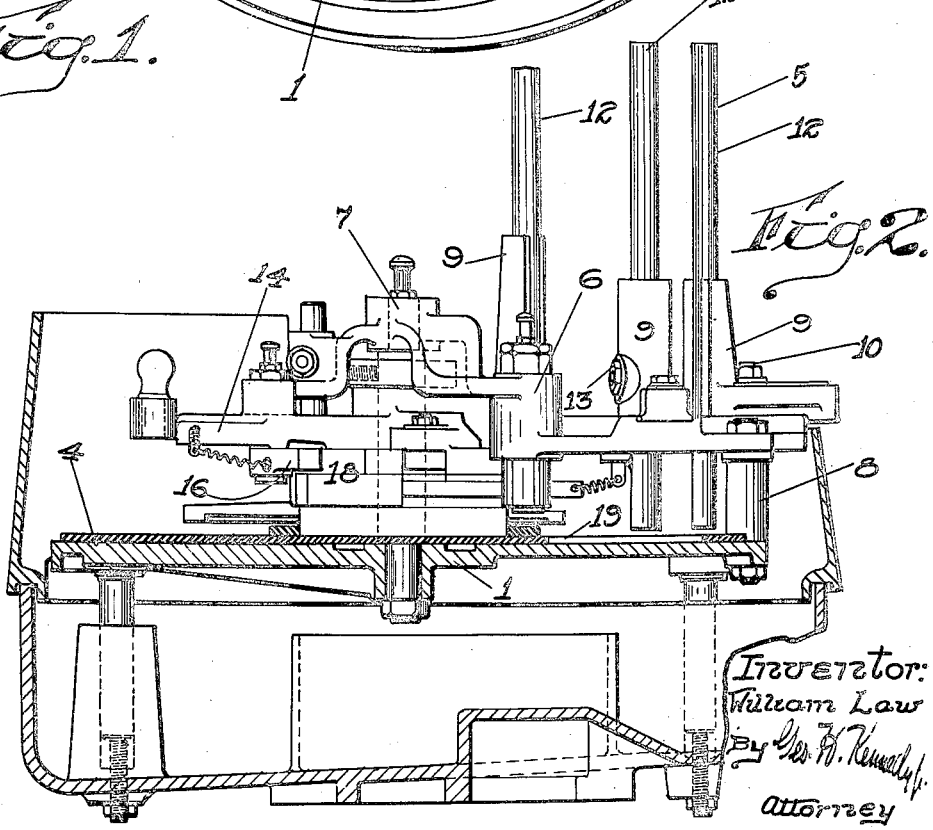
Fig. 2 is a view, partly in section and partly in elevation, of the mechanism shown in Fig. 1.
Figure 5:
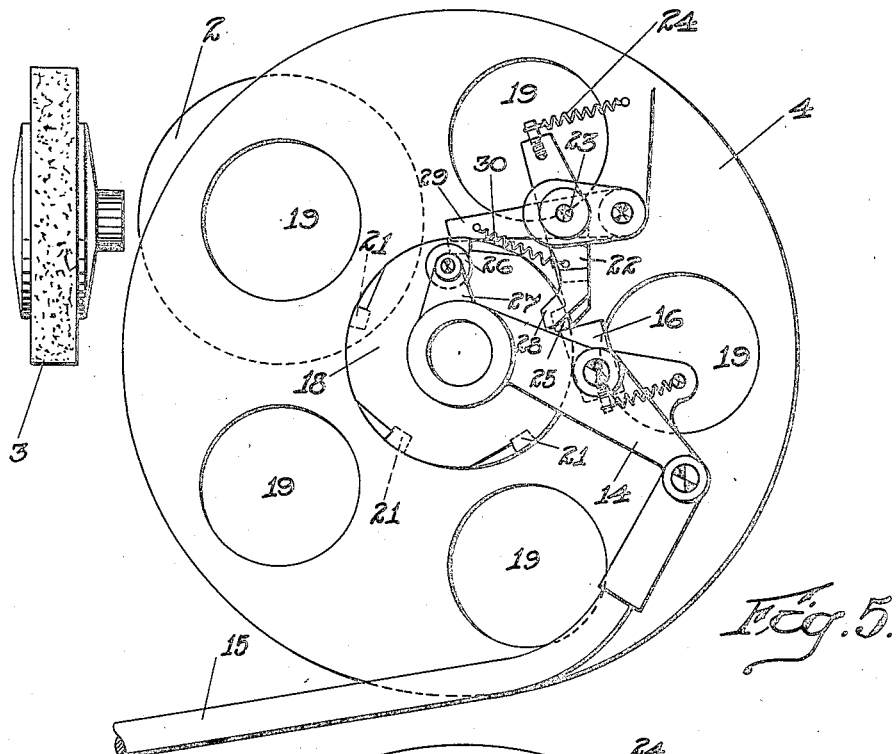
Figs. 5 and 6 are detached views, partly diagrammatic, showing the stopping and locking devices for the carrier disk.
Figure 6:
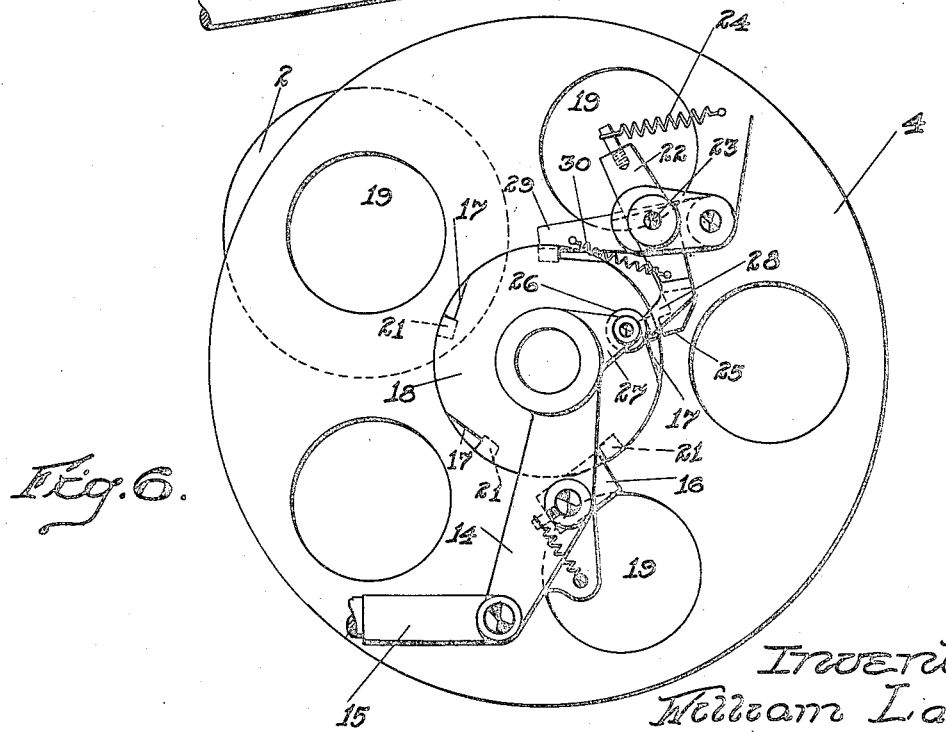

Referring first to Figs. 1 and 2, the numeral 1 indicates the stationary work supporting table of an automatic grinding machine, the latter preferably of the general type disclosed in United States Letters Patent to Littman, No. 1,361,883, dated December 14, 1920. The construction and operation of such a machine, aside from the work feeding and handling mechanisms herein described and claimed, form no part of the present invention, and hence is neither shown nor described in this application. For the purposes hereof, it is sufficient to note that in conjunction with the table 1, the machine provides a rotating work holding magnetic chuck 2, whose surface is flush with that of the table, and that the successive disposition of individual pieces of work upon said chuck, by movement across said table, procures the action upon said pieces of an overhanging grinding wheel 3, indicated by broken lines in Fig. 1.

The table 1 is of generally circular formation, and for the movement of the pieces of work on the surface thereof, the invention provides a movable work carrier in the form of a thin disk 4, concentric with the table 1 and in contact with the supporting surface of said table. According to the invention, the articles to be ground, such as piston rings or washers of uniform size, are held in the form of a vertical stack, within a magazine designated generally by the numeral 5, the lowermost article of the stack resting by gravity flat against the feeding disk 4, as hereinafter more fully described. In order to permit movement of the disk 4 without interference from the magazine 5, the latter has its support in a skeleton member 6, which is spaced above the table 1 and disk 4, being secured to the central post 7 on said table and to other posts 8, 8 projecting upwardly from the edge of said table beyond the periphery of the disk 4.

Adjustably supported on the stationary member 6 are a plurality of brackets 9, 9, arranged in a circular series, and each held to said member 6 by a bolt 10, the latter passing through an elongated slot 11 formed in the bracket, to permit of the bracket's adjustment, inwardly or outwardly, relative to the center of the stack. The brackets 9 carry the vertical standards 12, which cooperate, as will be apparent, to confine and guide the articles in stack formation,— these standards 12 being vertically adjustable in the brackets, by means of set screws 13, so as to obtain the proper spacing of their lower ends relative to the table 1, to permit successive withdrawals of articles from the bottom of the stack by the action of carrier disk 4, as will now be described.

The carrier disk 4 is adapted to be moved step-by-step, in a counterclockwise direction, and to this end an arm 14, adapted to swing on the post 7, has its outer end pivotally attached to a suitable rod or pitman 15, which, by connection to a crank or eccentric, not shown, secures the oscillation or vibration of said arm 14 through a limited arc. Said arm 14 carries a pivoted pawl 16, which is adapted to engage suitable notches 17 on the periphery of a plate 18. The latter, journaled for rotation on the post 7, is secured to the carrier disk 4, and consequently said carrier disk will rotate in unison with said plate when the latter partakes of the counterclockwise swinging movement of arm 14 at each engagement of the pawl 16 with a notch 17.

It will be clearly understood that each counterclockwise movement of arm 14 procures one step in the advancement of the carrier disk 4; but that on each reverse movement of the arm 14, the pawl 16 is inoperative, the carrier disk 4 being held stationary, in the manner and by the mechanism hereinafter described. The carrier disk 4, as shown in Fig. 1, provides a circular series of apertures 19, here shown as five in number, corresponding to the five steps or intermittent movements of said carrier disk in making one complete revolution. These apertures 19 are adapted to receive retaining rings 20, such retaining rings, as described in Patent Number 1,486,584 to James N. Heald, granted March 11, 1924, being provided in a plurality of sets, all of the same outside diameter, to fit the apertures 19, but of different inside diameters, to accommodate them to various sizes of work. The construction and mode of securing said rings in place form no part of the present invention, being fully described and claimed in the aforesaid application of Heald, and therefore a detailed description of this part of my machine is unnecessary.

In the operation of the mechanism, assuming the provision of the proper size rings 20 for the work that is stacked up in the magazine 5, it will be seen that each intermittent movement of the carrier disk 4 brings one of its apertures 19 directly below and into concentric relation to the stack of piston rings, washers, or the like, to be ground. During each such movement, the stack rests by gravity on the disk 4, the lowermost piece of said stack being in contact with the surface of said disk, but prevented from moving therewith by its confinement by the lower ends of the rods or standards 12, 12. As soon as one of the rings 20, of predetermined proper size, comes to rest, in registry with said lowermost article, the latter drops into the hole of said ring, and rests against the surface of table 1. Thereupon on the next movement of the carrier disk 4, said article is carried along with said disk, but the article next above confined by the rods 12, 12, is held at the bottom of the stack, and lies in contact with the surface of the moving disk 4. It will be understood that the proper vertical adjustment of the rods 12, 12 insures the release of an article upon its descent through one of the rings 20 into contact with the table 1, but insures the retention of an article so long as it rests on the surface of the disk 4.

The article thus removed from the bottom of the stack is conveyed by the disk into position for grinding, as indicated at A, Fig. 1. In this position, the article rests on the surface of the rotating magnetic chuck 2, and in consequence of its rotation, all parts of its surface are subject to the action of the grinding wheel 3, as will be well understood by those conversant with machines of this character. On the completion of this grinding operation, the withdrawal of the wheel 3 automatically initiates another movement of the arm 14 to actuate the carrier disk 4, and this movement of the carrier disk conveys the ground article across the face of table 1 to the position indicated at B, Fig. 1, at the same time bringing another article into grinding position, as will be well understood. The next ensuing movement of the carrier disk advances each of the several articles one step, bringing the first article to a position C, Fig. 1, where discharge may take place, in a manner hereinafter to be described. Upon such discharge, the ring 20, previously serving for the movement of said first article, becomes available again for the removal of another article from the bottom of the stack, this being accomplished by its travel from the next position, D, to the first described position of registration with said stack.

For holding the carrier disk 4 stationary, during each operation of grinding, and when the arm 14 is moving backwards preparatory to another actuation of said disk, the invention provides a combined stopping and locking mechanism, operable upon the plate 18 in the following manner:—Said plate 18, in addition to the notches 17, provides a series of peripheral slots 21, 21 for cooperation successively with a latch member 22, the latter being pivoted at 23 to the stationary skeleton member 6, and being subject to the action of a spring 24 which yieldingly presses the end 25 of said latch member against the periphery of plate 18, so as to cause said end to enter each slot 21 as it is brought opposite the latch. This action of the latch 22 insures the correct stoppage of the carrier disk 4 at each active stroke of the arm 14, and effectually prevents any overrunning of said disk by the momentum imparted thereto by said arm,—it being understood, of course, that the slots 21 are so spaced as to come into registry with the end 25 of the latch at the exact instant required for the stoppage of the carrier disk's rotation. On the reverse or inactive movement of the arm 14, provision is made for procuring, by said movement, the release of the plate 18 from the latching member 22, this being accomplished by a roller 26, carried by an angular extension 27 of arm 14 and engaging a cam projection 28 secured to the upper side of latch member 22. As shown in Fig. 1, where the arm 14 is just approaching the end of its reverse or inactive swing, the roller 26 is engaging the cam projection 28, which engagement throws the latch outwardly and thus frees the slot 21 from the latch end 25.

With the latch 22 thus effective to stop the carrier disk 4 and to prevent its further forward movement, the invention also contemplates the use of means to insure against any backward movement of the carrier disk 4, as the arm 14 swings back to release the latch 22, as above described; to this end, a pawl or lever 29, pivoted at 29', is pressed yieldingly against plate 18 by a spring 30, and the free end of this pawl is adapted to drop behind the front wall of that slot 21 which immediately precedes the slot engaged by the latch 22. In this way, any tendency for the disk 4 to move backward, either during or following the operative engagement of the latch 22, is positively counteracted, and when the next forward movement of the disk takes place, said pawl 29 readily yields outwardly.

At either of the stations B, C or D, provision may be made for discharging the ground articles, as conveyed one by one from the grinding station A. To this end, as illustrated in Fig. 3, the table 1 is provided, at the station selected, with a suitable aperture 31, adapted to receive a bushing 32 of appropriate size for the passage therethrough of the rings or other articles that are successively moved over said aperture by the carrier disk 4. Adjacent this point, the fixed framework of the machine, or as here shown the surrounding pan 33, has depending therefrom a rod or standard 34, to the lower end of which is secured a member 35 that furnishes horizontal pivotal support for a two-armed fitting 36. Each arm of the fitting 36 carries a pintle 37 that is receivable in an axial hole of an impaling member 38, which is thus removably supported on said fitting, and which, when thus supported, projects upwardly to dispose its pointed end 39 in centered proximity to the discharge aperture 31.

As shown in Fig. 4, the rings or other ground articles that are successively discharged through the aperture 31 become impaled on the member 38 directly beneath, and sliding down said member are stopped by the flange 40 thereof. When a complete stack of such articles has been collected, the finished or ground side of each article being always necessarily uppermost, the fitting 36 is swung to one side or the other, on the pivot provided by member 35, and thus the other impaling or receiving device 38 carried by the other arm of the fitting is disposed in operative relation to the aperture 31. Thereupon the filled receiving member 38 is withdrawn, simply by lifting it clear of its supporting pintle 37, and the articles thus collected can be loaded readily into the magazine 5 by simply inverting the member 38 over said magazine, thus presenting each article with its unground face uppermost so as to complete the automatic grinding of the articles on both faces or sides.

I claim:

1. In a grinding machine, a carrier for the articles to be ground, means for imparting step-by-step forward movements to said carrier, a latch engageable with said carrier to limit the extent of said forward movements, and separate means for preventing backward movement of said carrier in the intervals between said forward movements.

2. In a grinding machine, a carrier for the articles to be ground, a swinging arm adapted to impart step-by-step forward movements to said carrier, a latch engageable with said carrier to limit the extent of said forward movements on the operative or forward swing of said arm, means carried by said arm to release said latch on the inoperative or backward swing of said arm, and further means for preventing backward movement of said carrier after said latch is released and before the next forward swing of said arm begins.

3. In a grinding machine, a carrier for the articles to be ground, a swinging arm adapted to impart step-by-step forward movements to said carrier, a latch engageable with successive spaced slots in said carrier to limit the extent of each forward movement on the operative swing of said arm, and a pawl engageable with another one of said slots to prevent backward movement of said carrier on the inoperative swing of said arm.

4. In a machine for grinding apertured articles, such as rings, a support for such articles having an opening for the gravity passage of successive ground articles, means for moving said articles to said opening, a fitting, and a post carried by said fitting disposed below said opening for the impalement of said articles in stack formation, said post being removable from the fitting for the discharge of said articles in stack formation.

5. In a machine for grinding apertured articles, such as rings, a movable fitting carried by the machine, and a plurality of collecting devices for the impalement of the ground articles, said devices being removably carried on said fitting, and said devices, by the movement of said fitting, being movable successively into collecting position.

6. In a machine for grinding apertured articles, such as rings, a plurality of collecting devices disposed below a work table, radiating from a common center and adapted by rotation about said center to be disposed successively in position to accumulate a stack of ground articles.

7. In a machine for grinding apertured articles, such as rings, a plurality of collecting devices, each attached to but removable from the machine, for the impalement, ground face uppermost, of a stack of said articles, and a magazine from which said articles, before grinding, are fed, and to which the collected articles are transferred, ground face down, by inverting said collecting devices.

8. In apparatus of the class described, a rotatable member, a plurality of spaced ratchet teeth in the periphery of said member, a drive pawl to rotate said member by contact against said ratchet teeth, a plurality of notches in said member separate from said ratchet teeth, a latch to positively prevent over-running movement of said rotatable member by engagement with said notches, a hold pawl cooperating with said ratchet teeth for preventing retrograde movement of said member, and means for releasing said latch prior to each operation of said drive pawl.

Dated this 13th day of December, 1923.

WILLIAM LAW.